Oct. 7, 1958     E. M. ARENTZEN     2,855,062
DRIVE WHEEL FRICTION ASSEMBLY
Filed June 10, 1954     2 Sheets-Sheet 2

INVENTOR.
EINAR M. ARENTZEN
BY
*Christy Parmelee & Strickland.*

United States Patent Office 2,855,062
Patented Oct. 7, 1958

2,855,062

DRIVE WHEEL FRICTION ASSEMBLY

Einar Martin Arentzen, Pittsburgh, Pa., assignor to Lee-Norse Company, Charleroi, Pa., a corporation of Pennsylvania Application June 10, 1954, Serial No. 435,785

2 Claims. (Cl. 180—44)

The present invention is concerned with vehicle driving mechanisms and more specifically with vehicles having a plurality of individually driven wheels. One of the many types of such vehicles is the mine shuttle car such as is used to convey coal, slate etc. within the working passageways or tunnels of a mine. Such a vehicle operates over the usual mine floor, which in the working passageways are usually uneven, have holes therein, and perhaps cluttered with lumps of coal fallen from previous passing cars.

Frequently the wheels at each side of the car are tandem driven from a motor located at the respective side of the car. It is customary to dispose between the adjacent wheels at a side of the car a mechanism which normally divides the driving power equally between the associated wheels. Such a mechanism is similar to the differential drive between the rear transversely disposed wheels of an automobile so that in the event one wheel spins, there is no power in the adjacent wheel. To overcome this condition the differential can be removed and both wheels at the side of the shuttle car directly connected in tandem to the motor. The disadvantage inherent in such a construction is that when one of the tandem driven wheels spins, the other wheel receives the full driving power of the motor which imposes a greater torque upon the wheel drive than it can safely transmit.

An object of the present invention is to provide a safety device on each driven wheel which will yield upon application of a destructive torque force and prevent damage to the wheel driving mechanism.

Another object of the invention is to provide such a safety device which is adjustable so as to be pre-set to yield at a peak torque load and yet be again effective to drive the wheel upon reduction of the torque below the preselected maximum.

Figure 1:
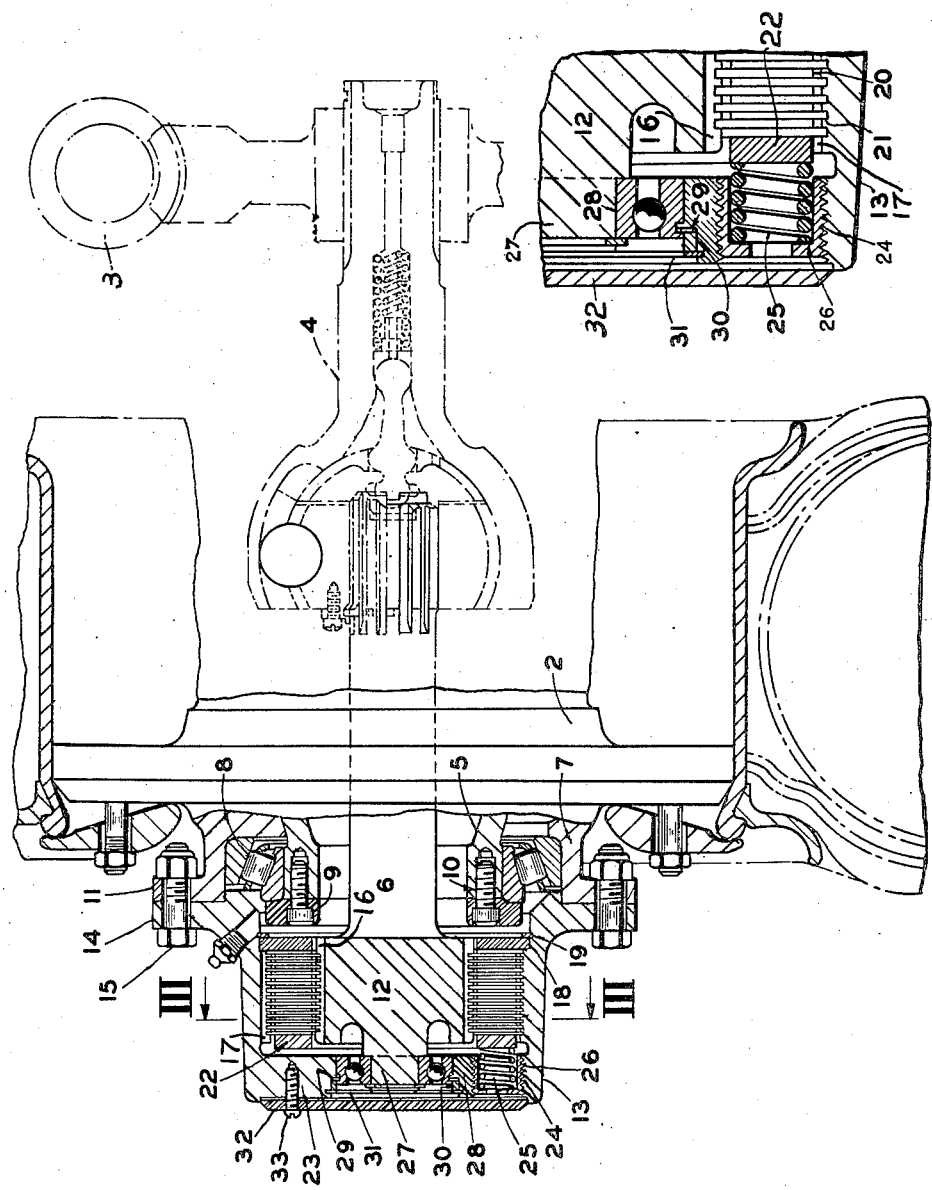
Figure 2:
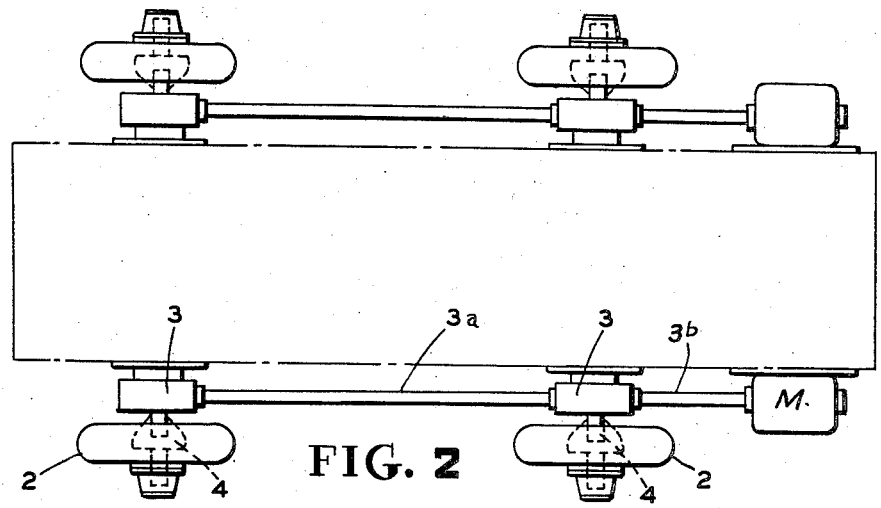
Figure 3:
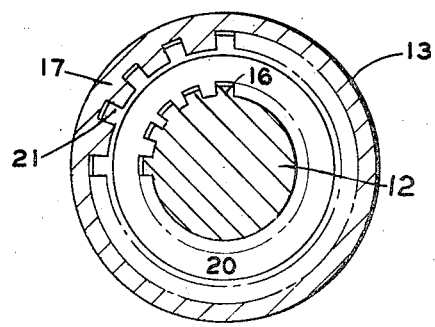
Figure 4:
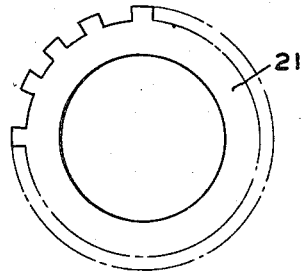
Figure 5:
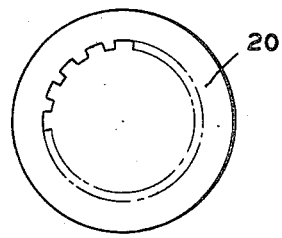

These and other objects will be made apparent from the accompanying description in which the drawings forming a part thereof comprise:

Fig. 1 which is an enlarged assembly of one driven wheel embodying the invention;

Fig. 2 is a schematic plan view of a vehicle showing the driven wheels at each side thereof;

Figs. 3, 4, and 5 illustrate details of the friction drive mechanism; and

Fig. 6 is an enlarged view of a portion of Fig. 1 to better disclose the friction discs and adjustment thereof.

Referring now in detail to the drawings, reference character 1 indicates a conventional showing of a mine shuttle car having a motor M and wheels 2 at each side thereof. Drives 3 of suitable design for each wheel 2 are connected in tandem by shafts 3a and 3b with the motor M at the respective sides of the car. Each wheel 2 includes a conventional portion 5 forming a hub support for the wheel and having a central opening through which extends a wheel driving shaft 6 having its inner end suitably connected with the shaft 4 of the wheel drive mechanism 3. A member 7 rigidly connected with wheel 2 rotates about hub 5 on suitable bearings such as 8 held in place by the member 9 and stud bolts 10. Flanges 11 are formed on member 7 for a hereinafter described purpose. The wheel mounting and drive so far described except for shaft 6 may be any one of several commercial form now available and form no part of the present invention. The shaft 6 has an enlarged head portion 12 extending beyond the wheel 2 and enclosed by a housing 13 rigidly connected with wheel member 7 through flanges 14 thereon. The flange 14 being connected with flanges 11 of wheel member 7 by bolts 15. Connecting shaft 6 with housing 13 for purposes of driving wheel 2 is a novel form of torque clutch which is designed to slip under a predetermined torque load for preventing damage to the wheel drive mechanism 4.

Shaft 6 head portion 12 is provided with external splines 16 and housing 13 has internal splines 17 therein extending parallel with the splines of shaft 6. Seated within housing 13 and encircling shaft head portion 12 is a ring member 18 retained in position by the snap ring 19. The shaft head 12 and housing 13 are connected by alternately arranged clutch discs 20 and 21, The discs 20 being mounted on shaft head portion 12 in engagement with splines 16 and the discs 21 mounted on housing 13 in engagement with splines 17. These clutch discs in assembled relation are engaged at one end by ring member 18 and at the opposite end by ring member 22. The outer end of housing 13 is provided with a web portion 23 having a plurality of threaded apertures 24 circumferentially arranged adjacent the periphery thereof in alignment with the overlapping portions of clutch discs 20 and 21. Within these apertures are disposed compression springs 25 and held in place by spring caps 26 having external threaded engagement with the apertures 24. The spring caps when rotated press springs 25 into engagement with ring member 22 causing clutch discs 20 and 21 to frictionally engage each other. The outer end of shaft 6 head portion 12 has a reduced end portion 27 which is supported in the web 23 of housing member 13 by the bearing 28. Bearing 28 being secured in web 23 by any suitable means such as ring members 29, 30, and 31. Closing the apertures in web 23 for reception of spring caps 26 and bearing 28 is a plate 32 held in place by any suitable means such as cap screws 33 received in suitable threaded openings formed in web 23.

Frictional engagement between the clutch discs 20 and 21 is controlled by adjustment of spring caps 26. By suitable rotation of the spring caps, springs 25 bearing on ring 22, are compressed and transmit the force of compression through ring 22 to the clutch discs. Thus the frictional engagement is adjustable and may be pre-set to transmit any torque load from shaft 6 to hub 13 and wheel 2 within the capacity of springs 25. The maximum torque load transmitted will of course be below that which may damage the driving mechanism 4 for the associated shaft 6.

The manner in which a destructive torque load may be imposed on shaft 6 can be readily visualized, as where one wheel of the car might strike an obstruction or drop into a hole in the tunnel floor so as to cause one of the wheels 2 at a side of the car to be elevated above the tunnel floor. In such a case all the power of driving motor M at such side of the car would be imposed on one of the wheels 2. Such a condition could damage the wheel driving mechanism 4. If however, the clutch discs 20 and 21 lack sufficient frictional engagement to transmit the full torque load thus suddenly imposed thereon they would slip relative to each other and prevent damage to the driving mechanism.

The specific details of construction disclosed herein are for purposes of illustration and not limitation except as made necessary by the scope of the appended claims.

I claim:

1. In a mine shuttle car having longitudinally spaced supporting wheels mounted on opposite sides thereof, the combination of a driven axle for each wheel and axially fixed with respect to said wheel, a power source at each side of the car, a tandem drive connection between each power source and the axles at the respective side of the vehicle, each said axle extending through its associated wheel for rotation independently of said wheel, a housing enclosing the extending end of said axle outwardly of each wheel, a rigid connection between said housing and associated wheel for concurrent rotation therewith, said axle having a bearing support upon said housing for rotation independently thereof, a plurality of frictionally engaging clutch discs encircling said axle within said housing and alternately connected with said housing and with said axle, means restricting movement of said discs in one direction longitudinally of said housing, and adjustable means mounted on said housing in engagement with said discs controlling frictional engagement between said discs providing preselected torque loads between the housing and associated axle.

2. The mine car as defined in claim 1, wherein the said adjustable means comprises a fixed abutment engaged by the innermost clutch disc, a movable abutment engaged by the outermost of the said clutch disc, resilient compression members mounted on said housing in engagement with said movable abutment, and means mounted on the housing in engagement with said compression members for imposing a preselected compressive force on said compression members.

References Cited in the file of this patent

UNITED STATES PATENTS

| | | |
|---|---|---|
| 1,043,111 | King et al. | Nov. 5, 1912 |
| 1,438,051 | Moakler | Dec. 5, 1922 |
| 2,226,759 | Fitzner | Dec. 31, 1940 |
| 2,333,980 | Branson | Nov. 9, 1943 |
| 2,338,160 | Arentzen | Jan. 4, 1944 |
| 2,358,236 | Lee | Sept. 12, 1944 |
| 2,714,935 | Papp | Aug. 9, 1955 |
| 2,771,147 | Ash | Nov. 20, 1956 |

FOREIGN PATENTS

| | | |
|---|---|---|
| 11,249 of 1912 | Great Britain | May 1, 1913 |